April 16, 1940.  H. V. TÖRNEBOHM  2,197,116
SNAP GAUGE
Filed July 2, 1936  2 Sheets-Sheet 1

INVENTOR.
Hilding Valdemar Törnebohm
BY
HIS ATTORNEY.

April 16, 1940.　　H. V. TÖRNEBOHM　　2,197,116
SNAP GAUGE
Filed July 2, 1936　　2 Sheets-Sheet 2
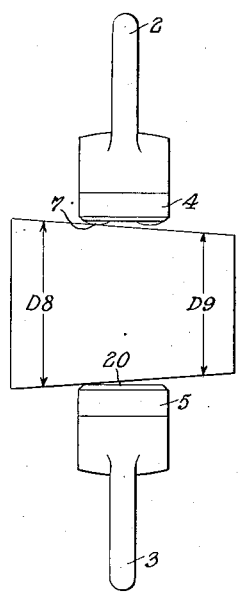
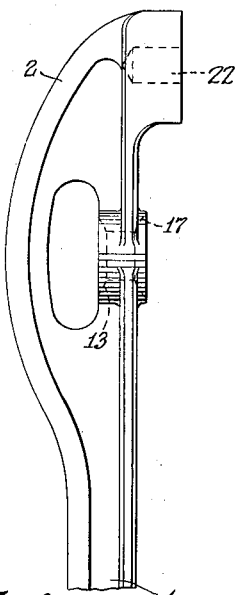
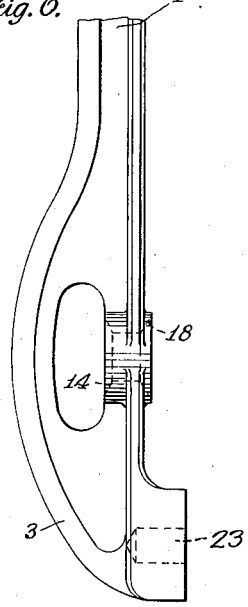
INVENTOR.
Hilding Valdemar Törnebohm
BY
HIS ATTORNEY.

Patented Apr. 16, 1940

2,197,116

UNITED STATES PATENT OFFICE 2,197,116

SNAP GAUGE

Hilding Valdemar Törnebohm, Goteborg, Sweden, assignor to Aktiebolaget Svenska Kullagerfabriken, Goteborg, Sweden, a corporation of Sweden Application July 2, 1936, Serial No. 88,584
In Sweden May 29, 1936

3 Claims. (Cl. 33—163)

The purpose of the present invention is to provide a gauge which is easier of adjustment than gauges of the hitherto usual type and which can be adjusted to a plurality of different nominal sizes while retaining the same anvil. Another purpose of the invention is to provide a snap gauge which insures that all parts of the surface of the work are within fixed tolerances. A still further purpose of the invention is to provide a snap gauge of a type in which gauges of a considerable range of nominal sizes can be made from a single or only a few different types or sizes of blanks. Finally the space required by the gauging surfaces along the length of the shanks of the gauge is less than in gauges of the usual type, whereby the gauge can be made more rigid.

In a snap gauge according to the invention, one of these anvils has a plane surface, while the other anvil has a surface with a convex profile in the plane of the gauge. For gauging the high limit of the work the latter anvil is preferably given the form of a portion of a cylinder, the axis of which is parallel with the axis of the work, and for gauging the low limit the gauging surface of the anvil is of comparatively small extension in an axial direction of the work, is preferably convex in form and may form part of a spherical surface. Since one of the anvils has a cylindrical surface, its adjustment will be very much simpler than will be the case with snap gauges of the type hitherto in use, since it is only necessary to attain parallelism in one direction instead of as previously in two directions perpendicular to each other. Hereby a still further advantage is attained, namely that the gauge can be easily made adjustable, since it is not necessary to consider parallelism in a direction perpendicular to the axis of the work. By making the gauging surface of one of the anvils on the low limit side of comparatively small length in an axial direction it is possible to gauge the diameter of the work in a plurality of planes.

Figure 1:
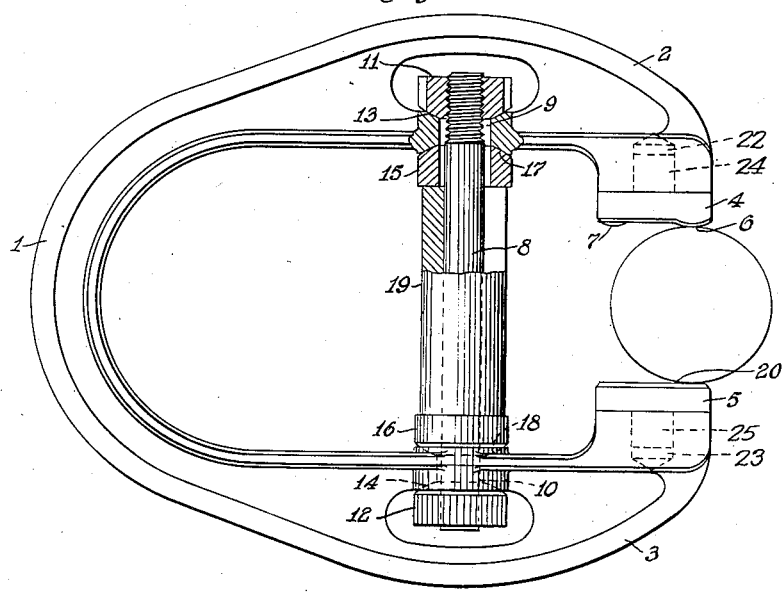
Figure 2:
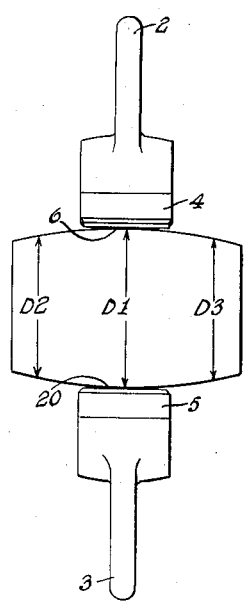
Figure 3:
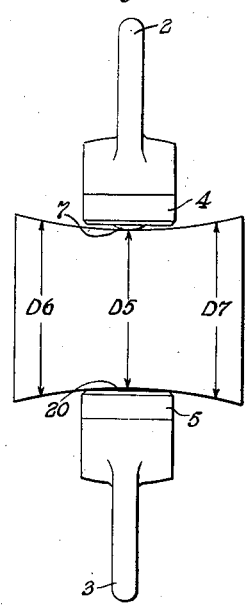

One form of the invention is illustrated on the accompanying drawings in which:

Figure 1 shows a side view of a snap gauge,

Figure 2 shows an end view of a portion of the gauge during the operation of gauging and illustrates how the comparatively long cylindrical gauging surface on the high limit side gauges the greatest diameter of the work, Figure 3 shows a similar view and illustrates how the short gauging surface of the low limit side gauges the smallest diameter of the work, Figure 4 shows a corresponding view of a gauge for gauging the low limit and provided with two gauging surfaces on one of the anvils, Figure 5 shows a plan of an anvil for a tolerance snap gauge, and Figure 6 shows a blank for the production of a series of snap gauges of different nominal sizes.

The frame part of the snap gauge illustrated in the figures is horse shoe shaped or U-shaped and has a portion 1 comprising the bow of the U which is capable of being sprung under pressure. It also has shanks 2 and 3 to which are fixed anvils 4 and 5. One of the anvils 5 has a plane gauging surface 20 while the other anvil 4 has a gauging surface 6, which together with the surface 20 determines the high limit, and a gauging surface 7, which together with the gauging surface 20 determines the low limit. The surface 6 has the form of a relatively long circular cylinder, while the surface 7 comprises two convex surfaces. The convexity of the surfaces greatly facilitate adjustment of the gauge, since the amounts of material which must be removed are considerably less than in the case with the usual relatively large plane surfaces.

The anvils are fixed to the shanks by means of pins 24 and 25 carried by their rear surfaces which are pressed into holes 22 and 23 in the shanks. The anvil 4 is located so that the cylindrical surface 6 is perpendicular to the direction of applying the device in gauging.

The nominal gauging dimension of the snap gauge is determined by means of a screw device comprising a double ended screw 8, the ends of which pass through holes 9 and 10 in the shanks 2 and 3 and are threaded for nuts 11 and 12. The inner sides of the nuts are spherical and engage corresponding spherical surfaces 13 and 14 on the shanks, so that there will always be surface contact between the nuts and the surfaces 13 and 14 independent of the size of the angle between the shanks 2 and 3. Washers 15 and 16 are disposed on the screw 8 between the shanks 2 and 3. The outer surfaces of the washers are spherical and engage corresponding spherical surfaces 17 and 18 on the inner sides of the shanks. The play between the holes of the washers 15 and 16 and the screw 8 is comparatively great, whereby the washers are free to move in a radial direction relative to the screw and adjust themselves so that there is always proper surface contact between the washers and the shanks. Between the washers 15 and 16 is disposed a distance sleeve 19, which is horseshoe shaped in cross section. In other words, the sleeve is open at one side so that it can be brought into place sideways to surround the screw 8. It is apparent that if the nuts 11 and 12 are tightened so that the sleeve 19 is clamped between the washers 15 and 16, while the shanks 2 and 3 adjust themselves through springing of the part 1, the length of the distance sleeve 19 will determine the distance between the gauging surfaces 6 or 7 and the gauging surface 20 on the anvil 5. By making the distance sleeve 19 of different lengths and interchangeable it is, therefore, possible within certain limits to use the same frame and the same anvils for different nominal sizes, whereby, however, the tolerance zone is determined by the form and dimensions of the anvil 4.

The operation of gauging diameters with the new snap gauge is carried out in the same manner as with snap gauges of the hitherto used types. Figure 2 shows the operation of gauging a work piece having one of its diameters $D_1$ in the vicinity of its central plane greater than the diameters $D_2$ and $D_3$ at the ends of the work piece. The figure illustrates the manner in which the snap gauge gauges the greatest diameter $D_1$ for the reason that the gauging surfaces on the high limit side have comparatively long straight surfaces consisting of a plane surface on the one side and of a relatively long cylindrical surface on the outer side. Such cylindrical surface is long relative to the surface for gauging the surface for the minimum dimension, and is made as long as may be convenient, although its length is naturally limited for practical reasons. The surface for gauging the maximum dimension is made as long as is practicable and the surface for gauging the minimum dimension as short as is practicable.

Figure 3 illustrates how it is possible to discover a concavity of the work piece. With the aid of a gauge of the usual type, in which the gauging surfaces of the low limit side comprise only two relatively great plane surfaces, it would only be possible to gauge the greatest diameters $D_6$ and $D_7$ of the work piece of Figure 3, without discovering that one of the diameters $D_5$ is less than the low limit. With the gauge according to the invention, on the other hand, it is possible to discover such inaccuracies, since the length of one of the gauging surfaces 7 is comparatively small.

The gauge according to Figure 4 has two gauging surfaces instead of one, as is the case with the gauge according to Figure 3. The surfaces 7 of Figure 4 are located at some distance from each other in the direction of the axis of the work. Since the surfaces 7 are located near the side planes of the shanks 2, it is possible to gauge diameters close to shoulders etc.

Since there are two gauging surfaces located at some distance from each other, it is possible to discover conicity of the work piece. In the example illustrated in Figure 4 the work piece is tapering and the diameter $D_8$ is shown to be greater than the diameter $D_9$. If the diameter $D_8$ is within the determined tolerance limits, the surface of the work piece will contact with the gauging surface 7 on the left hand side of the figure, while the other diameter $D_9$, if it is less than the low limit, will freely pass the other gauging surface 7. When carrying out the gauging operation the gauge will, therefore, have a tendency to swivel about that one of the gauging surfaces 7 which comes into contact with the work.

The anvil of Figure 5 may be used for gauging a work piece such as is shown in Figure 3 in the direction of gauging represented in that figure. If one of the gauging surfaces for gauging the minimum dimension should happen to coincide with the minimum diameter of the work piece, the effect would be similar to that described in connection with Figure 4 of the drawings. In other words, one of the surfaces for gauging the minimum dimension would pass over the work piece, while the other surface would be arrested and a certain tilting movement of the gauge would result.

By making one of the gauging surfaces plane and the other gauging surface convex in the direction of gauging it will be possible, as above pointed out, to adjust the gauge by altering the angle between the shanks by means of the screw device, since it is not necessary to maintain the gauging surfaces parallel in the direction of gauging. It is hereby made possible to use a blank of a single type and size for making gauges of a considerable number of different nominal sizes. The basic form of the blank is shown in Figure 6. As will be seen from Figure 1, the blank must be bent at its central portion to a certain U-shaped curvature, the size of which within certain limits is determined by the desired nominal size of the gauge. The blank shown in Figure 6 may for example be used for gauges having nominal sizes between 10 and 30 mm., the same curvatures being used for sizes between 10 and 18 mm., another curvature for sizes between 18 and 24 and still another curvature for sizes between 24 and 30 mm. The nominal sizes of the gauges are then determined by the length of the distance sleeves 19, whereby the length of the distance sleeves must be adjusted exactly to correct length in each separate case. By using only a few sizes of blanks it is, therefore, possible to produce gauges having different nominal sizes extending over the whole range of sizes used in practical gauging operations with gauges of this type.

The distance between the cylindrical and spherical surface on the anvil 4 can be made short as compared with the corresponding distance in a gauge with two plane surfaces, whereby the gauge can be made more rigid.

Having thus described my invention, I claim and desire to secure by Letters Patent:

1. A snap gauge consisting of a U-shaped frame comprising a pair of shanks united by means of an intermediate portion capable of being sprung, the shanks being interconnected by means of a screw device adapted to adjust the relative position of the shanks, and gauging surfaces formed on the shanks, there being a distance sleeve disposed between the shanks, the length of the said distance sleeve determining the gauging dimension between the gauging surfaces of the snap gauge, the distance sleeve being U-shaped in section and disposed about the screw device.

2. A snap gauge consisting of a U-shaped frame comprising a pair of shanks united by means of an intermediate portion comprising the bow of the U and capable of being sprung, the shanks being interconnected by means of a screw device adapted to adjust the relative position of the shanks, and gauging surfaces formed on the shanks, there being a distance sleeve disposed between the shanks, the length of the said distance sleeve determining the gauging dimension between the gauging surfaces of the snap gauge, the distance sleeve being U-shaped in section and disposed about the screw device, and two opposed anvils carried by the frame, one of the anvils having a plane gauging surface, the surface of the other anvil being formed in part as a cylinder and in part as portions of a pair of spheres.

3. A snap gauge frame of U-shape, comprising a pair of shanks united by means of an intermediate portion capable of being sprung, the shanks being interconnected by a screw device adapted to adjust the relative position of the shanks, an interchangeable distance sleeve disposed between the shanks, the length of the said distance sleeve determining the dimension between the shanks, the distance sleeve being open sided and disposed about the screw device.

HILDING VALDEMAR TÖRNEBOHM.